United States Patent [19]
Klopfer

[11] Patent Number: 4,489,217
[45] Date of Patent: Dec. 18, 1984

[54] SHIELD CONNECTION DEVICE

[75] Inventor: Henry E. Klopfer, Sunnyvale, Calif.

[73] Assignee: Raychem Corporation, Menlo Park, Calif.

[21] Appl. No.: 366,268

[22] Filed: Apr. 7, 1982

[51] Int. Cl.$^3$ .............................................. H02G 15/18

[52] U.S. Cl. ................................ 174/35 C; 174/75 C; 174/DIG. 8

[58] Field of Search ..................... 174/35 R, 35 C, 36, 174/DIG. 8, 88 C, 75 C; 339/143 R

[56] References Cited

U.S. PATENT DOCUMENTS

| | | | |
|---|---|---|---|
| 3,946,143 | 3/1976 | McLoughlin | 174/35 C |
| 4,246,438 | 1/1981 | Gozlan | 174/DIG. 8 |
| 4,384,404 | 8/1983 | Watine | 174/DIG. 8 |

*Primary Examiner*—A. C. Prescott
*Assistant Examiner*—D. A. Tone
*Attorney, Agent, or Firm*—Ira D. Blecker; James W. Peterson; Herbert G. Burkard

[57] ABSTRACT

Disclosed herein is a shield connection device for terminated cable shields. The device includes a first hollow heat-recoverable member having open ends and a second hollow deformable member having open ends with one end being within the first member. The device includes shielding between the end of the second member within the first member and the first member. The shielding includes a quantity of fusible material on that portion of the shielding outside the second member. The device is partially recovered to secure the shielding between the members but not sufficiently recovered to melt the fusible material or fully recover the first member.

9 Claims, 4 Drawing Figures

SHIELD CONNECTION DEVICE

BACKGROUND OF THE INVENTION

This invention relates to devices for terminating electromagnetic interference (hereinafter EMI) shielded wiring and more particularly to heat-recoverable shield connection devices for terminating shielded wiring which include their own EMI shielding.

In many military and civilian applications, it is very desirable to have cable, harnesses or the like wiring which include either individually EMI shielded conductors or gross EMI shielded conductors and in some instances both individually and gross shielded conductors. It is necessary to terminate the cable's shielding for connection to control panels, P.C. boards or for connection with other wiring and the like. It is desirable to maintain EMI shielding from the device's shield termination point up to and including the connection point.

Conventional EMI shielding is a metallic braid which often proves difficult to work with at connection points because the braid filaments often fray. Conventional methods of tying off the braid include stripping back the cable's braid a few inches behind the connection point and, thereby leaving the insulated conductors unshielded a few inches behind the connection point. This exposure to possible EMI of insulated conductors greatly reduces the overall beneficial effects of the cable's EMI shielding. To avoid this possible EMI exposure, there should be 360° of EMI shielding from where the braid is tied off (the termination point) up to and including the connection point. Rigid tubular connection devices having EMI shielding may be used to solve the problem but many applications, e.g. back shell connections, require flexible EMI shielding. Conventional braid has proven satisfactory for flexible applications. In fact, De Groef et al U.S. Pat. No. 4,144,404 and Gozlan U.S. Pat. No. 4,246,438 disclose the use of such braid for coaxial cable connections. A desirable shield and a means for preventing fraying of the shield.

As will be appreciated the terminated end of the cable's braid is quite delicate and frays quite easily. If one terminates the cable's braid and inserts it into either of the above cited references, fraying and damage will generally result to the cable's and device's EMI shielding. The damage to the device's shield may cause gaps in the EMI shielding for the cable resulting in poor overall EMI shielding efficiency. Inserting the cable's EMI braid into known termination devices must be done carefully and gently in order not to damage the device's shield. This required care results in greatly increased labor costs for providing good overall EMI protection.

The device of the instant invention provides an inside guide means which facilitates a fast, labor efficient method of inserting the terminated end of a cable's braid into a connection device. Additionally, the device of the instant invention provides an inside guide means for preventing damage to the cable's braid and promoting overall EMI shielding protection. Additionally, the device of the instant invention provides its own EMI shielding which defines a 360° EMI gross shield for EMI shielding from the cable's shield termination point to the connection point.

SUMMARY OF THE INVENTION

The instant invention is a shield connection device for terminated cable shields. The device includes a first hollow heat-recoverable member having open ends and a second hollow deformable member having open ends with one end being within the first member. The device includes an EMI shielding means having one end between the end of the second member within the first member and the first member. The means is preferably flexible and defines a gross shielding means for the cable. The device's EMI shielding means includes a quantity of fusible material outside the second member. The opposite end of the second member defines an inside guide means for inserting and guiding the terminated end of the cable's EMI shield to its proper location within the device, namely adjacent the fusible material within the device.

The device is partially recovered to trap the device's EMI shield means between the first and second members but not recovered so much that it either fully recovers the first member or flows the fusible material on the device's EMI shielding means.

The second member provides an inside guide means for labor efficient insertion of the device's terminated shield end as well as providing a means for preventing damage to the device's EMI shielding means. The second member further provides a means for guiding the cable EMI shield to its proper location within the device.

The device's EMI shielding is preferably a flexible braid having one end between the members and including a quantity of solder positioned outside the second member so that upon full recovery the cable's terminated shield and the device's shield form a permanent and strong bond. In this way, the device provides 360° of EMI shielding from the point of termination up to and including the connection point where the device's EMI shielding braid may be terminated by appropriate means.

The first member is heat-recoverable and preferably diminishes in diameter as heat is applied. This has the effect of deforming the second member and braid around the inserted cable. As heat is further applied and the first member recovers; thereby, the cable is more tightly held in proper position by the deforming second member. The cable is locked in proper position relative to the device's EMI shielding and particularly the fusible material. As heating is continued, the fusible material melts flowing the fusible material into the voids of each of the cable's and device's EMI shielding, if such exist. When braid, the preferred EMI shielding is used and joined in this fashion, it has the effect of making a solid and near perfect EMI protection joint around the cable at, what is believed to be, the cable's weakest EMI shielding point. The further recovery of the first member also has the effect of squeezing the melted fusible material into any voids in either the cable's or device's EMI shielding means.

DESCRIPTION OF THE PREFERRED EMBODIMENT

Figure 1:
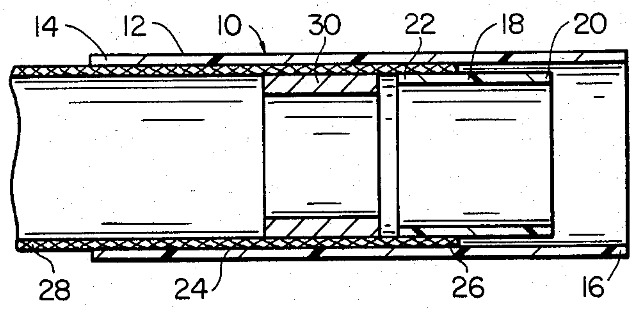
FIG. 1 illustrates in cross-section a shield connection device in accordance with this invention before heat recovery.

With reference to the drawing wherein like reference characters designate like or corresponding parts throughout the several views and referring particularly to FIG. 1, there is shown a shield connection device in accordance with this invention generally indicated by the numeral 10 before heat recovery.

The device 10 as shown in FIG. 1 includes a first member 12. The first member is a hollow heat-recoverable and preferably cross-linked sleeve having open ends 14 and 16. The tube may be made heat-recoverable and cross-linked by a variety of means including those described and shown in Cook U.S. Pat. No. 3,253,618 and Cook et al U.S. Pat. No. 3,253,619 which are both incorporated herein by reference.

As explained earlier the first member 12 is heat-recoverable to shrink down upon the second member and the device EMI shielding means upon initial heating to fix the elements of the device in place. The first member is heat-recoverable so that upon final termination the fusible material on the device's EMI shielding means is squeezed between the device's EMI shielding means and the cable's EMI shielding means to promote better EMI efficiency. Further, the heat recoverability aids in strain relieving the cable within the device.

The first member is preferably cross-linked to promote greater durability and flexibility. As will be appreciated more fully hereinafter, when both the first and second members are made from heat-recoverable cross-linked polyvinylidene fluoride as well as other materials, the members fuse and join together forming a permanent-type bond further fixing the device's EMI shielding means between the members and further securing and strain relieving the cable within the device. It is also preferable to have the first member cross-linked to prevent environmental damage to the device because cross-linked polyvinylidene fluoride is particularly resistant to the expected environmental conditions normally found in use.

Cross-linking of the first member further allows the user to heat the device to a higher temperature than would otherwise be possible without damage to the device. Additionally, cross-linking permits a greater variety of heating sources to be used including open flame and hot air as well as other means. Additionally, cross-linking the first member allows the user greater flexibility in selecting the type of fusible materials to be used. For instance, some high temperature fusible materials including high temperature solder may be used since the melting point of the cross-linked first member would be greater than the high temperature solder, whereas if non-cross-linked materials were used it is likely that the first member would melt upon temperature required to melt such high temperature solder. The first member 12 is made from an insulating material which as will be appreciated more fully hereinafter acts as an insulator for the device's EMI shielding means.

The device 10 includes a second hollow deformable member 18 which in the preferred embodiment is heat-recoverable and cross-linked. The second member 18 is a sleeve having open ends 20 and 22. As can be seen from the figures at least one end 22 is within the first member 12 and preferably a substantial portion, if not all, of the second member 18 is within the first member 12.

As will be appreciated, the second member merely need be deformable to carry out the purposes and objects of this invention. However, in the preferred embodiment shown in the figures, the second member 18 is heat-recoverable and cross-linked for reasons similar to the first member being heat-recoverable and cross-linked. In addition, the heat recoverability of the second member 18 acts as a means for further strain relieving and holding the cable within the device upon final termination. And as explained earlier, when both the first and second members are made from polyvinylidene fluoride and cross-linked there is a permanent-type bond formed therebetween which further acts to trap the device's EMI shielding braid between the members. The first and second members are preferably transparent so the user can see when to remove the heating source. Further, it is preferable to join the ends 16 and 20 of the first and second members together. This is done by bonding.

The device 10 includes an EMI shielding means 24. The shielding means 24 has a first end 26 between members 12 and 18 and a portion 28 outside the members. The shielding means is flexible and preferably is a metallic braid which is electrically conductive and infusible at a temperature which causes the members 12 and 18 to recover and the fusible material to melt. The braid is preferably a tube which is similarly shaped to the first member and provides 360° of EMI shielding.

Figure 2:
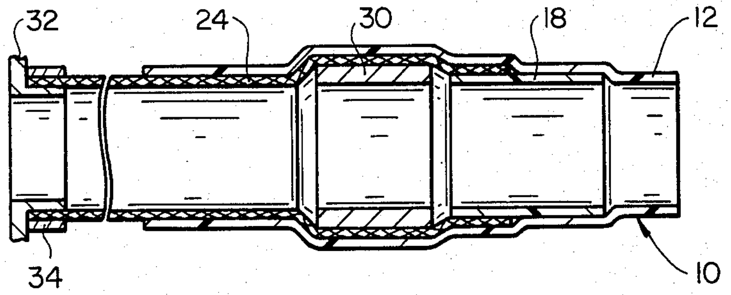
FIG. 2 illustrates the device of FIG. 1 after heat recovery and before use.

As explained earlier, the device 10 is first initially heated trapping the means 24 between the members. Upon further heating the means 24 deforms in conformance with the cable inserted therein as forced by the recovering first member 12. This provides an excellent EMI gross shielding means to the cable. As can be seen in FIG. 2, the other end of device's shielding means 24 is attached to a shielded connector 32. Thereby, the unshielded portion of the cable is protected against EMI from the cable's EMI shield termination point up to and including the connection point.

The means 24 includes fusible material which is preferably a fluxed solder preform 30. Under certain circumstances, it is best to have a solder preform with a flux core, while under other circumstances it is best to have a solid preform completely coated with flux. For other applications it may be desirable to use a conductive polymer with nickel as the fusible material. The preform 30 is positioned in the preferred embodiment just behind end 22 of the second member 18. This positioning acts to encourage correct indexing and positioning of a cable inserted therein. The preform 30 in this embodiment defines an indexing means so that when the exposed braid of the cable is inserted into the device, the user sees a natural stopping point indicating correct positioning of the cable within device 10.

With particular reference to FIG. 2, there is shown device 10 after initial heating. It will be noticed that device 10 includes a connector ring 32 attached to shielding means 24 by holding ring 34. Upon heating, the first member decreases diameter as it recovers deforming the means 24 and second member 18 and trapping the means 24 between the members 12 and 18.

It will be appreciated that the device 10 is not initially heated to a sufficient temperature to cause the fusible material to melt, but only sufficiently enough to deform the means 24 and member 18 and trap the means 24 between first and second members, 12 and 18, respectively. As will be explained more fully hereinafter, a cable having conductors with individual EMI shields is inserted through one end of the device 10 for EMI protection from the cable's shield termination point up to and including connector ring 32.

Figure 3:
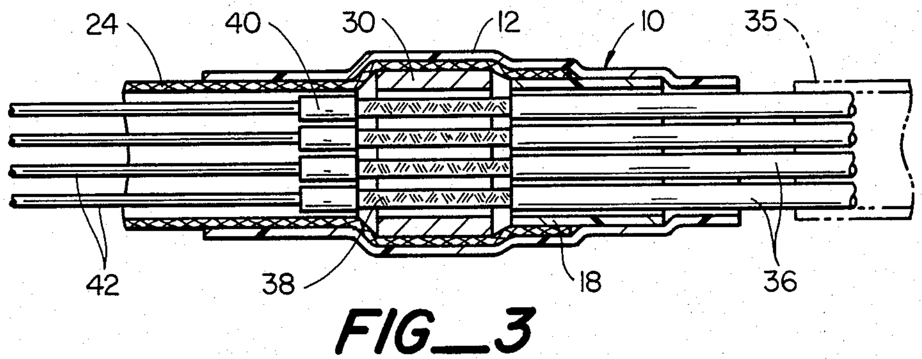
FIG. 3 illustrates in cross-section the installation of a shield connection device in accordance with this invention over individually shielded conductors of a cable.

With particular reference to FIG. 3, there is shown the initially heated device 10 with a cable 35 installed therein. The cable 35 includes individual conductors 36 each having an exposed EMI shield portions 38, positioned adjacent the solder preform 30. Before installation, part of the insulation 40 of the individual conductors 36 is stripped back as shown in FIG. 3. It is further preferable to strip back the EMI shield 38 and insulation 40 at the terminus of each conductor 36 exposing the dielectric 42 of each conductor 36 to the device's EMI shield means 24. The means 24 thereby defines a gross EMI shield for the conductors from the solder preform 30 (the shield termination point) to the connector ring 32 (the connection point).

The exposed shield portions 38 are aligned with the solder preform 30 during installation. As will be appreciated, the portions 38 include many exposed strands which can be damaged easily and which can easily damage the device's EMI shielding means 24 causing EMI gaps. The second member 18 provides an inside guide means for guiding the exposed shield portions 38 to their proper alignment with the device's shield means 24 without damage.

Alternatively, a gross shield may surround the cable 35 when the cable is inserted into the device 10. In this case, the second member 18 provides a means for guiding the exposed gross shield into alignment with the solder preform 30 and means 24 without damage.

The first member 12, upon further heating, shrinks further diametrically forcing the individual conductors into close proximity with the means 24 and solder preform 30. The heating is continued until the solder flows. The first member 12 continues to shrink diametrically, thereby maintaining the above recited components of the device 12, 18, 24 and 30 in proper positioning relative the conductors 36 and further securing and strain relieving the conductors. Additionally, the diametric shrinking of the first member 12 causes the fluid solder to be pressed into the exposed individual shield portions 38 and forces the fluid solder to fill the voids of the device's and cable's shielding braid in accordance with Brooks U.S. Pat. No. 4,092,193, which is incorporated herein by reference. As will be appreciated even if damage does occur to the device's EMI shielding braid, the subsequent filling by the fusible material still provides an excellent EMI shield at the juncture point of the device's and cable's EMI shielding.

Figure 4:
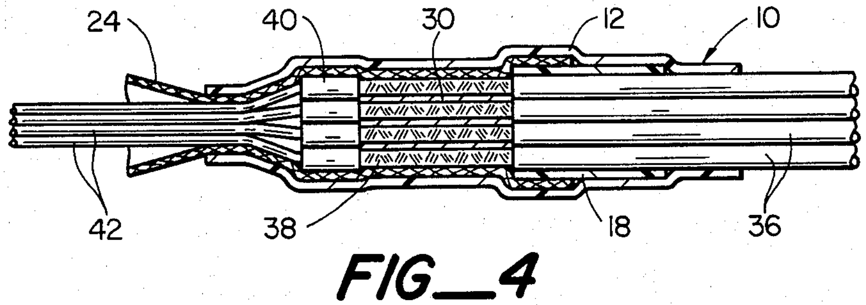
FIG. 4 illustrates the completed shield connection of conductors of the cable with the device of FIG. 3.

With particular reference to FIG. 4, there is shown the device 10 after the shields of the conductors 36 have been finally terminated. The first member 12 provides insulation to the shield means 24 and the individual exposed shield portions 38. The shield means 24 and the exposed shield portions 38 are strain relieved at the soldered termination by the heat-recoverable first member 12 and in the preferred embodiment by the heat-recoverable second member 18. The conductors 36 are provided with gross EMI shield via means 24 from the soldered termination point to the connector ring 32.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed:

1. A flexible shield connection device, comprising:

a first hollow heat-recoverable member having open ends;

a second hollow deformable heat-recoverable member having open ends and one end being within the first member; and flexible means for shielding electromagnetic interference having one end between the first member and the end of the second member within the first member, the flexible means defining a gross shielding means and the opposite end of the second member defining an inside guide means, the flexible means including a quantity of fusible material on that portion of the means outside the second member, thereby as heat is applied to the device the first member recovers deforming the flexible means and second member and trapping the flexible means between the first and second members forming a flexible device.

2. A device as set forth in claim 1, wherein the first and second members are cross-linked.

3. A device as set forth in claim 2, wherein the members are joined at the end opposite the flexible means.

4. A device as set forth in claim 2, wherein the members are transparent.

5. A device as set forth in claim 2, wherein the flexible means comprises a metallic braid of electrically conductive material which is infusible at the temperature which causes the device to recover and the fusible material to melt.

6. A device as set forth in claim 5, wherein the fusible material is electrically conductive.

7. A device as set forth in claim 6, wherein the fusible material comprises solder.

8. A flexible shield connection device, comprising:

a first hollow heat-recoverable member having open ends;

a second hollow deformable member having open ends and one end being within the first member; and flexible means for shielding electromagnetic interference having one end between the first member and the end of the second member within the first member, the flexible means defining a gross shielding means and the opposite end of the second member defining an inside guide means, the flexible means including a quantity of fusible material on that portion of the means outside the second member, thereby as heat is applied to the device the first member recovers deforming the flexible means and the second member and trapping the flexible means between the first and second members forming a flexible device, wherein the members are joined at the end opposite the flexible means.

9. A flexible shield connection device, comprising:

a first hollow heat-recoverable member having open ends;

a second hollow deformable member having open ends and one end being within the first member; and flexible means for shielding electromagnetic interference having one end between the first member and the end of the second member within the first member, the flexible means defining a gross shielding means and the opposite end of the second member defining an inside guide means, the flexible means including a quantity of fusible material on that portion of the means outside the second member, thereby as heat is applied to the device the first member recovers deforming the flexible means and second member and trapping the flexible means between the first and second members; said first and second members, said flexible means and said fusible material cooperating to form a flexible shield connection device wherein said fusible material is restricted to a central portion of said flexible shield device.

* * * * *